Silas Dodson,
Portable Mill.

No. 72822 — Patented Dec 31 1867

Witnesses
Alex T. Roberts
L. M. Covington

Inventor
Silas Dodson
per Munn & Co
Attorneys

United States Patent Office.

SILAS DODSON, OF JERSEY CITY, NEW JERSEY.

*Letters Patent No. 72,822, dated December 31, 1867.*

IMPROVED PORTABLE MILL.

*The Schedule referred to in these Letters Patent and making part of the same.*

TO ALL WHOM IT MAY CONCERN:

Be it known that I, SILAS DODSON, of Jersey City, in the county of Hudson, and State of New Jersey, have invented a new and useful Improvement in Portable Mills; and I do hereby declare that the following is a full, clear, and exact description thereof, which will enable those skilled in the art to make and use the same, reference being had to the accompanying drawings, forming part of this specification, in which—

Figure 1:
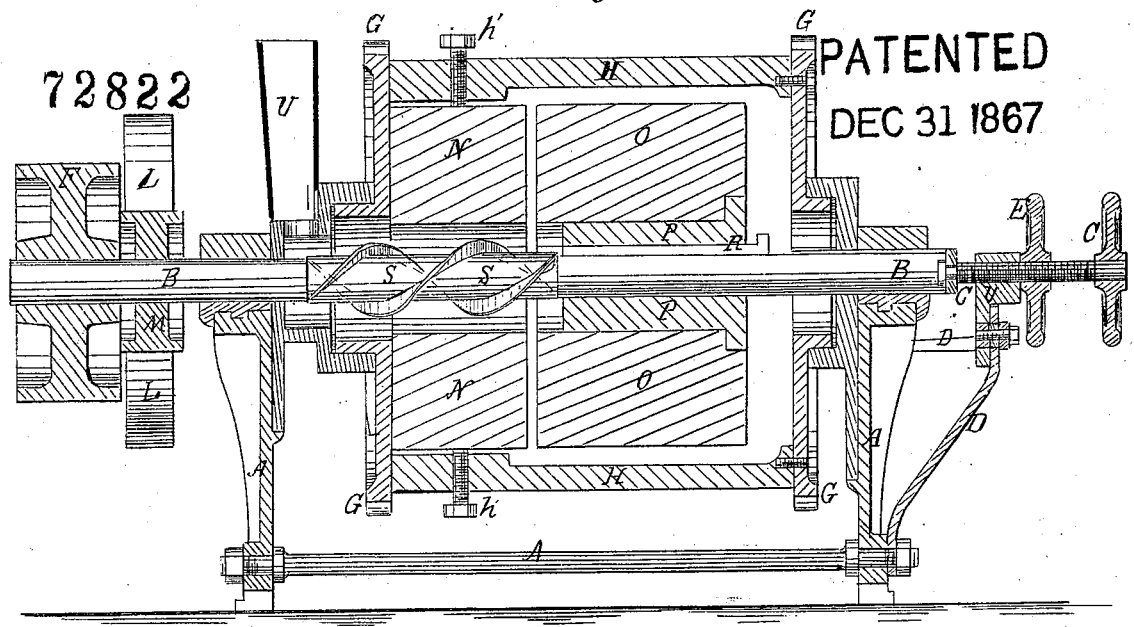
Figure 1 is a vertical section of my improved mill, taken through the line $x$ $x$, fig. 2.
Figure 2:
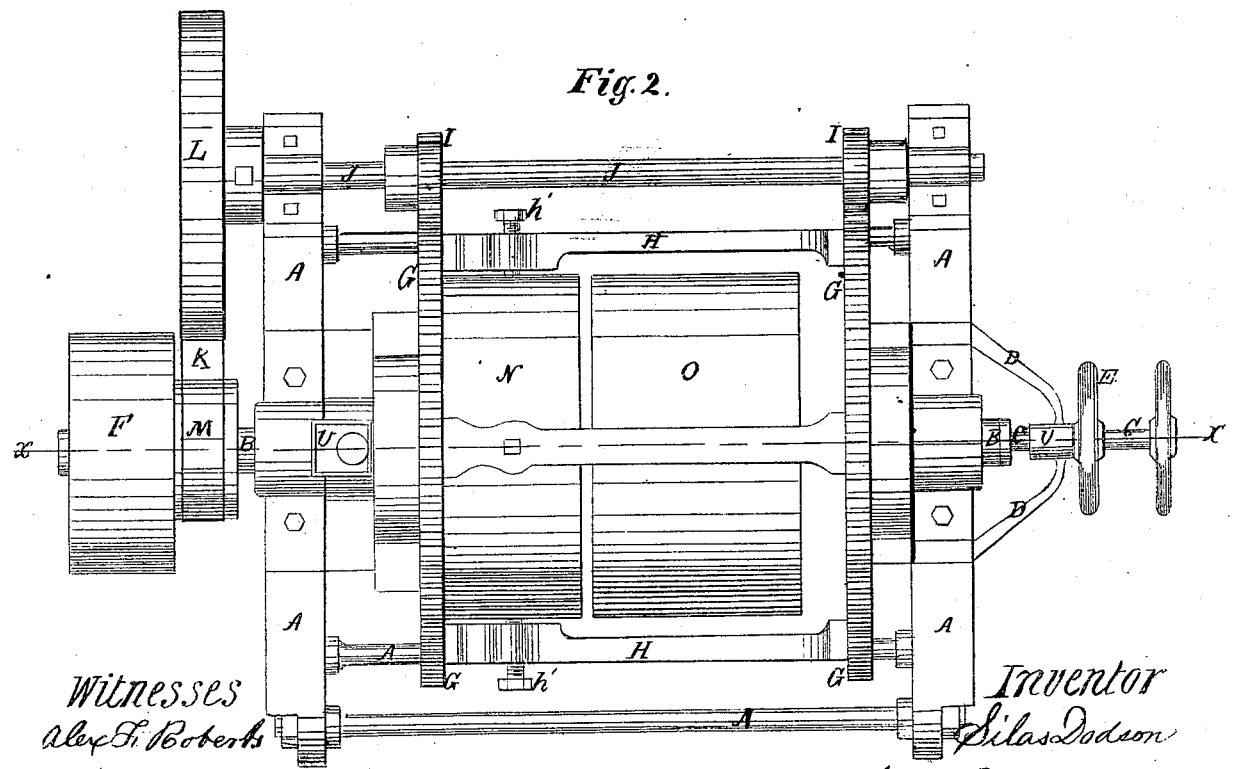
Figure 2 is a top view of the same.

My invention has for its object to furnish an improved grinding-mill, simple in construction, convenient of adjustment, and which will do its work faster and better than the mills constructed in the usual manner; and it consists in the construction, combination, and arrangement of the various parts, as hereinafter more fully described.

A is the framework of the mill. B is a shaft, which revolves in bearings in the frame A in such a way that it may have a longitudinal movement in said bearings. The shaft B is moved longitudinally and adjusted by means of the hand-screw C, the forward end of which is swivelled to the end of the shaft B, and which passes through a nut, V, which is supported and connected to the frame A by the supporting-braces or arms D. E is a binding-nut placed upon the screw C to secure the shaft B in place when adjusted. To the other end of the shaft B is attached the pulley F, to which the power is applied. This enables the mill to be connected directly to the line-shaft, rendering any intermediate gearing unnecessary. G are two disks that have large circular holes through their centres, through which the shaft B passes. Around the holes through the disks G are formed outwardly-projecting circular flanges, upon which the disks revolve in bearings attached to the frame A. The disks G are rigidly connected to each other by the bars H. Upon the edges of the disks G are formed teeth, which mesh into the teeth of the small gear or pinion-wheels I attached to the shaft J, which revolves in bearings in the frame A, and to which motion is given by the band K that passes around the pulley L attached to the said shaft J, and around the pulley M attached to the shaft B. By this arrangement the disks G will be revolved in the opposite direction from the shaft B, and with a slower movement. N is an annular burr-stone, adjustably suspended from the bars H by means of the set-screws $h'$, so as to be carried around by the revolution of the disks G. O is a burr-stone, which is secured to the shaft B by the bush P and key R, so as to be carried with said shaft in its revolution. This enables the stones N and O to be adjusted so as to increase or diminish the distance apart of their grinding-faces, as may be desired, by simply operating the hand-screw C. S is a sleeve fitting upon the shaft B, to which it is adjustably secured by a set-screw, so as to be carried with the said shaft in its revolution. T are spiral threads or flanges formed upon the sleeve S to convey the grain forward through the eye of the stone N to the space between said stones, where it is ground. The grain enters through the spout U, the upper end of which is connected with the hopper. For convenience in taking the mill apart to dress the stones, the disks G may each be made in two parts secured to each other by bolts passing through lugs formed upon said parts. By this arrangement of the stones the fine flour all passes out, and does not remain in the grooves of the stones to become heated by the action of the mill.

I claim as new, and desire to secure by Letters Patent—

The arrangement of the burr N, adjustably secured to the cross-bars H of the toothed disks G, revolving in one direction, and the burr O upon the longitudinally-adjustable shaft B revolving in independent bearings in the opposite direction, said shaft carrying the adjustable conveyors S, as herein shown and described.

The above specification of my invention signed by me, this 19th day of September, 1867.

SILAS DODSON.

Witnesses:
WM. F. MCNAMARA,
JAMES T. GRAHAM.